US008350414B2

(12) United States Patent
West

(10) Patent No.: US 8,350,414 B2
(45) Date of Patent: Jan. 8, 2013

(54) SEMICONDUCTOR ASSISTED DC LOAD BREAK CONTACTOR

(75) Inventor: Richard T. West, Ragged Point, CA (US)

(73) Assignee: Xantrex Technology Inc., Livermore, CA (US)

( * ) Notice: Subject to any disclaimer, the term of this patent is extended or adjusted under 35 U.S.C. 154(b) by 342 days.

(21) Appl. No.: 12/854,223

(22) Filed: Aug. 11, 2010

(65) Prior Publication Data

US 2012/0038227 A1 Feb. 16, 2012

(51) Int. Cl.
*H02J 1/00* (2006.01)

(52) U.S. Cl. ........................................................ 307/85

(58) Field of Classification Search ..................... 307/85
See application file for complete search history.

(56) References Cited

U.S. PATENT DOCUMENTS

| | | | | |
|---|---|---|---|---|
| 4,172,268 | A | 10/1979 | Yanabu et al. | |
| 4,198,668 | A | 4/1980 | Bergdahl et al. | |
| 4,249,223 | A | 2/1981 | Shuey et al. | |
| 4,251,845 | A | 2/1981 | Hancock | |
| 4,420,784 | A | 12/1983 | Chen et al. | |
| 4,618,906 | A | 10/1986 | Paice et al. | |
| 6,643,112 | B1 | 11/2003 | Carton et al. | |
| 6,956,725 | B2 | 10/2005 | Boughton, Jr. et al. | |
| 7,521,914 | B2 | 4/2009 | Dickerson et al. | |
| 7,538,990 | B2 | 5/2009 | Belisle et al. | |
| 7,646,275 | B2 | 1/2010 | West | |
| 2003/0193770 | A1 | 10/2003 | Chung | 361/118 |
| 2008/0143462 | A1 | 6/2008 | Belisle et al. | 335/201 |
| 2009/0097172 | A1 | 4/2009 | Bremicker et al. | |

FOREIGN PATENT DOCUMENTS

| | | |
|---|---|---|
| DE | 102007042903 | 1/2009 |
| SU | 964758 | 10/1982 |

OTHER PUBLICATIONS

International Search Report, mailed Nov. 28, 2011, issued in corresponding International Patent Application No. PCT/US2011/046891 (4 pages).

Written Opinion, mailed Nov. 28, 2011, issued in corresponding International Patent Application No. PCT/US2011/046891 (8 pages).

*Primary Examiner* — Robert L. DeBeradinis
(74) *Attorney, Agent, or Firm* — Nixon Peabody LLP

(57) ABSTRACT

An electrical switch apparatus for use in connecting and disconnecting a DC power source and a load includes first and second pairs of controllable electromechanical contacts coupled to the DC power source and the load for connecting the power source to the load when the contacts are closed, and disconnecting the power source from the load when the contacts are open. A controller is coupled to the electromechanical contacts and programmed to produce control signals for opening and closing the contacts. A diode is coupled to the electromechanical contacts to prevent electrical current from flowing from the load to the power source, and a controllable semiconductor switch is coupled to the controller and across the power source for momentarily short circuiting the source in response to a control signal indicating a transition of either or both of the first and second pairs of electromechanical contacts from a closed condition to an open condition.

17 Claims, 5 Drawing Sheets

SEMICONDUCTOR ASSISTED DC LOAD BREAK CONTACTOR

FIELD OF THE INVENTION

The present invention relates to a hybrid electrical switch having a closed, conducting state for connecting a DC power source to a load, and an open, non-conducting state for disconnecting the DC power source from the load.

BACKGROUND OF THE INVENTION

Breaking high DC currents at relatively high voltages has typically been accomplished with high-cost equipment. For example, a large number of electromechanical contacts in series have been used to achieve DC load break capability. Magnetic arc blowouts or arc chutes have also been used in conjunction with electromagnetic contactors, and contacts have been put in vacuum-encased glass "bottles" to reduce arc potential under load break. There is a need for a lower-cost way of breaking high DC currents at relatively high voltages.

SUMMARY

In accordance with one embodiment, an electrical switch apparatus for use in connecting and disconnecting a DC power source and a load includes first and second pairs of controllable electromechanical contacts coupled to the DC power source and the load for connecting the power source to the load when the contacts are closed, and disconnecting the power source from the load when the contacts are open. A diode is coupled to the electromechanical contacts to prevent electrical current from flowing from the load to the power source, and a controllable semiconductor switch is coupled to the controller and across the power source. A controller coupled to the electromechanical contacts and the controllable semiconductor switch is programmed to produce a control signal for turning the semiconductor switch on and off, and to produce a control signal for turning the semiconductor switch on to momentarily short circuit the DC power source when at least one of the first and second pairs of electromechanical contacts transitions from a closed condition to an open condition.

In one implementation, the controller is programmed to control the semiconductor switch to momentarily short the DC power source, and to open at least one of the pairs of electromechanical contacts while the DC power source is short circuited by the semiconductor switch.

In another implementation, the controller is programmed to open at least one of the first and second pairs of electromechanical contacts, and to control the semiconductor switch to momentarily short the DC power source immediately after the opening of the at least one of the first and second pairs of electromechanical contacts.

A further implementation includes a third pair of controllable electromechanical contacts connected in parallel with the diode, and the controller is programmed to close the third pair of electromechanical contacts in response to a command to open at least one of the first and second pairs of contacts.

BRIEF DESCRIPTION OF THE DRAWINGS

The advantages of the present disclosure will become apparent upon reading the following detailed description and upon reference to the drawings, in which.

DETAILED DESCRIPTION

Figure 1:
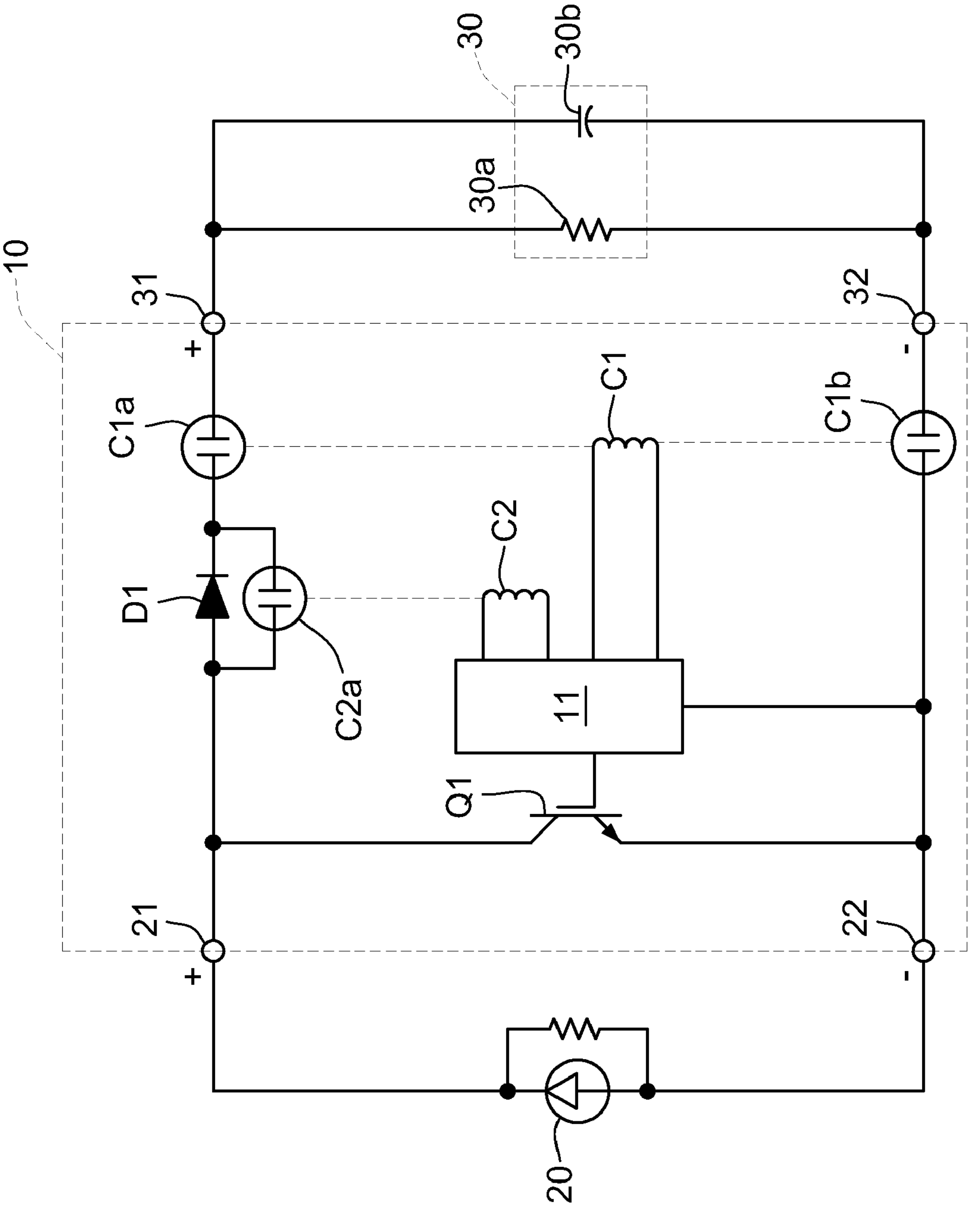
FIG. 1 is an electrical schematic diagram of a hybrid electrical switch coupling a DC source and resistive and capacitive loads.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

FIG. 1 illustrates a hybrid electrical switch 10 that couples a DC power source 20, such as a photovoltaic source, with a load 30 that is illustrated as having a resistive component 30*a* and a capacitive component 30*b*. The illustrative switch 10 is shown in FIG. 1 as a two-port device having the source 20 connected to the switch 10 at + and – input terminals 21 and 22, respectively, and having the load 30 connected to the switch 10 at + and – output terminals 31 and 32, respectively. The switch 10 has an open, non-conducting state in which the source 20 and the load 30 are disconnected, and a closed, conducting state in which the source 20 and the load 30 are connected. In the conducting state, current flows from the + input terminal 21 through a diode D1 and a pair of closed contacts C1*a* to the + terminal 31 of the load 30. Current returns from the – load terminal 32 through a pair of contacts C1*b* to the – terminal 22 of the source 20.

The source 20 is shown as a non-ideal current source, but other types of DC power sources may be used. For example, the switch 10 may be used with a voltage source having limited current capability, and may also have an associated complex distributed LRC impedance.

The switch 10 includes a programmable controller 11, such as a microprocessor, that provides coil power to a contactor coil C1 that controls the opening and closing of the two pairs of contacts C1*a* and C1*b*, which in turn determine whether the switch 10 is in its open or closed state. The controller 11 also provides power to a contactor coil C2 that controls when a pair of contacts C2*a* are closed to shunt current around the diode D1, during steady state conditions when the switch is in its closed, conducting state. The shunt formed by closing the contacts C2*a* avoids conduction losses in the diode D1 when the diode is not needed.

The controller 11 also provides a gate drive signal to a transistor Q1 connected across the input terminals 21 and 22. The controller 11 can receive inputs such as external commands to open or close the hybrid switch and/or can generate commands internally in response to inputs from one or more sensors. The controller 11 provides specific timing sequences when transitioning the switch 10 between its closed and open states.

When the switch 10 is in the open, non-conducting steady state, the contacts C1*a* and C1*b* are open, and the transistor Q1 is off. When the switch 10 is in the closed, conducting steady state, the contacts C1*a* and C1*b* are closed, and the transistor Q1 is off. When the switch 10 transitions between its open and closed states, there are two primary "make" sequences and two primary "break" sequences that can be executed by the controller 11, as follows:

Load Make Sequence #1

(i) Contactor coil C2 is energized to close contacts C2*a*.

(ii) After the worst case close and bounce time for contacts C2*a* has expired, contactor coil C1 is energized to close contacts C1*a* and C1*b*.

Load Make Sequence #2

(i) Transistor Q1 is driven "on."

(ii) Contactor coils C2 and C1 are energized to close contacts C2*a*, C1*a* and C1*b*.

(iii) After the worst case close and bounce time for contacts C2*a*, C1*a* and C1*b* has expired, transistor Q1 is driven "off."

Load Break Sequence #1

(i) Contactor coil C2 is de-energized to open contacts C2*a*.

(ii) After the worst case time for contacts C2*a* to open, transistor Q1 is driven on and conducts all the current from source 20 plus the transient diode D1 recovery current.

(iii) After diode D1 has recovered, the current path from load capacitance 33 through transistor Q1 is blocked.

(iv) Coil C1 is de-energized to open contacts C1*a* and C1*b*.

(v) After a delay to ensure contacts C1*a* and C1*b* are fully open, transistor Q1 is driven off.

Load Break Sequence #2

(i) Contactor coil C2 is de-energized to open contacts C2*a*.

(ii) After the worst case time for contacts C2*a* to open, coil C1 is de-energized to open contacts C1*a* and C1*b*, after a sub-second delay time. Contacts C1*a* and C1*b* may (by design) sustain an arc.

(iii) After a delay to ensure that contacts C1*a* and C1*b* are fully open, transistor Q1 is driven on and conducts all of the current from source 20 plus transient diode D1 recovery current as a function of the available arc current conducted pole-to-pole across contacts C1*a* and C1*b*.

(iv) After the worst cased diode recovery time, the arc is quenched and transistor Q1 is driven off.

The controller can be programmed to execute any combination of the above sequences. In both Load Break Sequences #1 and #2, the contacts C1*a* and C1*b* need only be AC rated because the contacts are not required to break a sustained DC arc. The potential arc energy is removed from the conduction paths that include the contacts C1*a* and C1*b* by shorting the source 20 with the transistor Q1. In Load Break Sequence #1, the recovery current of the diode D1 is much greater than that in Load Break Sequence #2, and therefore the stress on the diode D1 is greater. In Load Break Sequence #2, the arcing time of the contacts C1*a* is much longer than that in Load Break Sequence #1. The best sequence is determined as a function of the application and the type of components used in a given hybrid switch design. The contacts C2*a* are only used to remove diode D1 conduction losses by shunting diode D1 current through contacts C2*a* during steady state conditions when the hybrid switch is in the closed, conducting state. As part of any state transition sequence, i.e., in either a making or breaking sequence, the contacts C2*a* are always fully open before the transistor Q1 is driven on.

Figure 2:
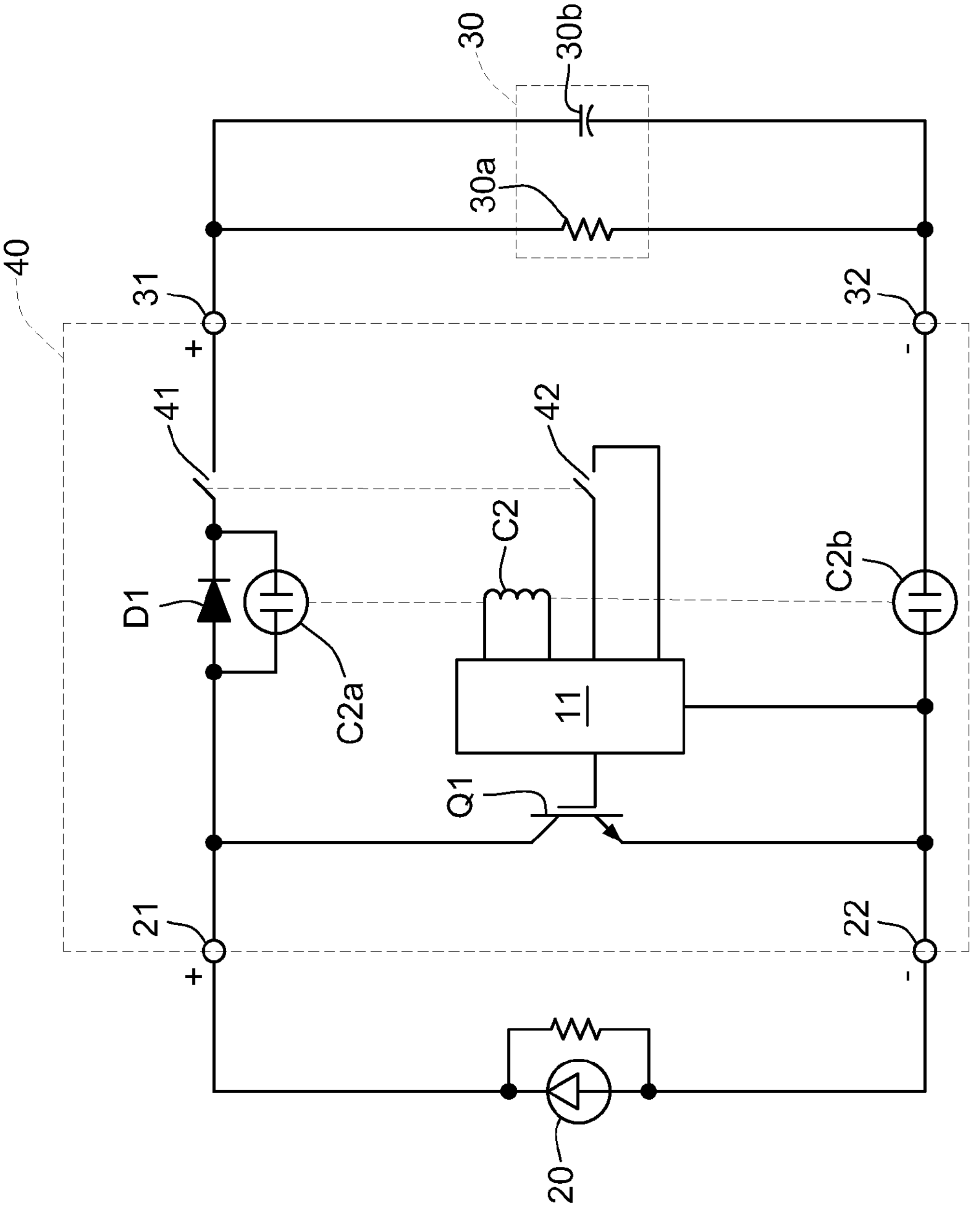
FIG. 2 is an electrical schematic diagram of a modified version of the hybrid electrical switch of FIG. 1.

FIG. 2 illustrates a modified hybrid switch 40 that includes a manually operated disconnect switch having a power pole 41 and a ganged auxiliary switch contact 42 connected to the control circuit 11 to enable the control circuit to detect opening and closing of the power pole 41. This disconnect switch may be integral to the hybrid switch as shown or may be external and logically interlocked by any number of methods.

When the disconnect switch is opened under load, one of the following Load Break Sequences is executed by the control circuit 11:

Load Break Sequence #1

(i) Transistor Q1 is driven on and conducts all the current from source 20 plus the transient diode D1 recovery current.

(ii) After diode D1 has recovered, the current path from load capacitance 33 through transistor Q1 is blocked.

(iii) Coil C1 is de-energized to open contacts C1*a* and C1*b*.

(iv) After a delay to ensure contacts C1*a* and C1*b* are fully open, transistor Q1 is driven off.

Load Break Sequence #2

(i) Coil C1 is de-energized to open contacts C1*a* and C1*b*, after a sub-second delay time. Contacts C1*a* and C1*b* may (by design) sustain an arc.

(ii) After a delay to insure that contacts C1*a* and C1*b* are fully open, transistor Q1 is driven on and conducts all of the current from source 20 plus transient diode D1 recovery current as a function of the available arc current conducted pole-to-pole across contacts C1*a* and C1*b*.

(iii) After the worst cased diode recovery time, the arc is quenched and transistor Q1 is driven off.

The disconnect switch power pole 41 need not be rated for DC load break because the transistor Q1 automatically "steals" the potential arc energy from the contacts C1*a* and the power pole 41 after an open disconnect switch condition is indicated by the auxiliary switch contact 42.

Figure 3:
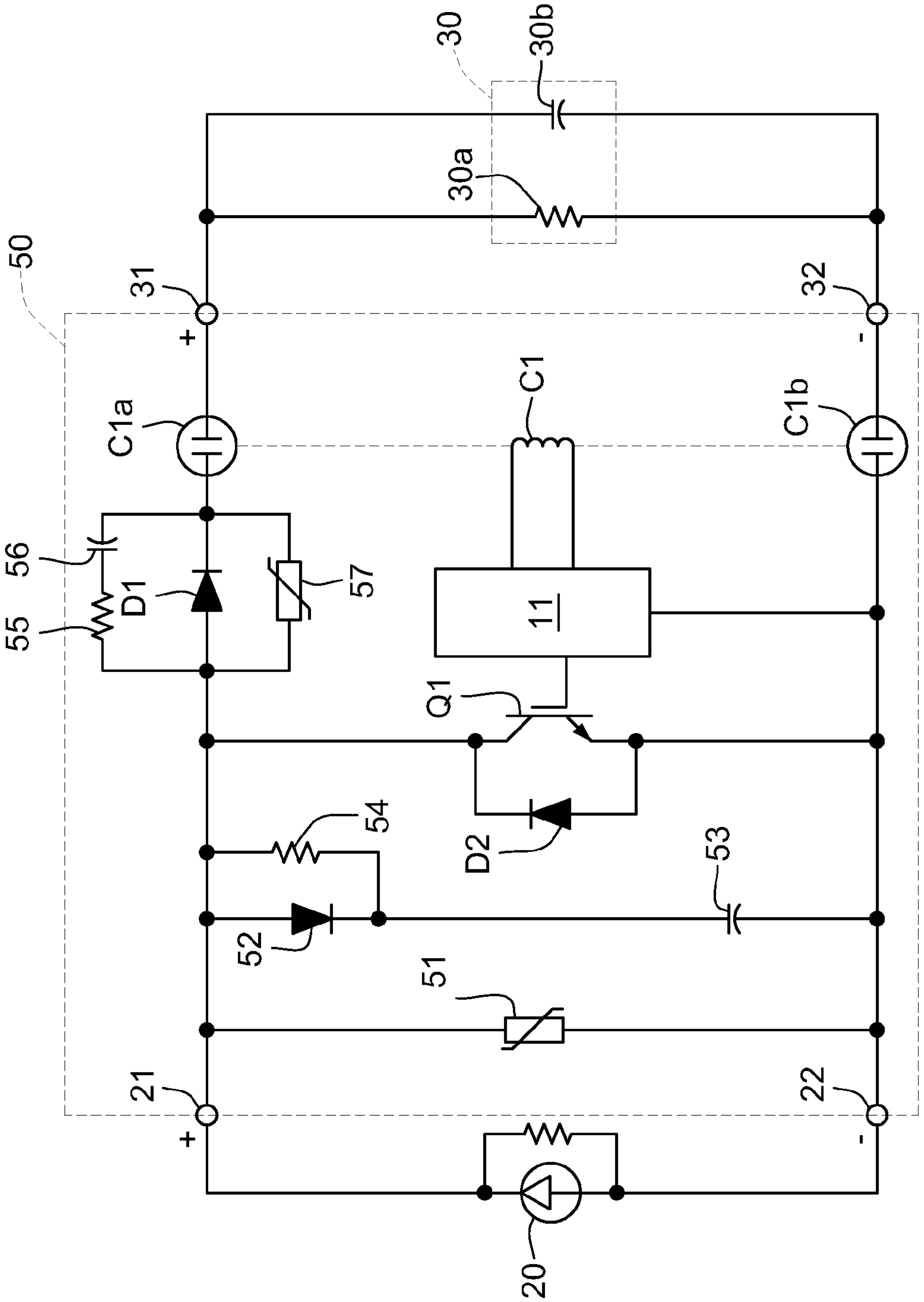
FIG. 3 is an electrical schematic diagram of another modified version of the hybrid electrical switch of FIG. 1.

FIG. 3 illustrates another modified hybrid switch 50 that includes additional components to protect the semiconductor components from switching- or lightning-induced voltage transients. A transient voltage suppressor such as a varistor 51 connected across the input terminals 21 and 22, and thus across the transistor Q1, ensures that the breakdown voltage of the transistor Q1 is not exceeded. A diode D2 is also connected across the transistor Q1 to provide reverse polarity protection for the transistor Q1 and to clamp any reverse polarity differential voltage transients across the input terminals 21 and 22. A clamp network formed by a diode 52, a capacitor 53 and resistor 54 slows the voltage rise time across the input terminals 21 and 22 when the transistor Q1 turns off and serves to clamp and damp ringing from parasitic inductances. This clamp network also reduces the stress on the varistor 51. A resistor 55 and a capacitor 56 damp the ringing across the diode D1 during diode recovery, and a transient voltage suppressor such as a varistor 57 ensures that the breakdown voltage of the diode D1 is not exceeded.

Figure 4:
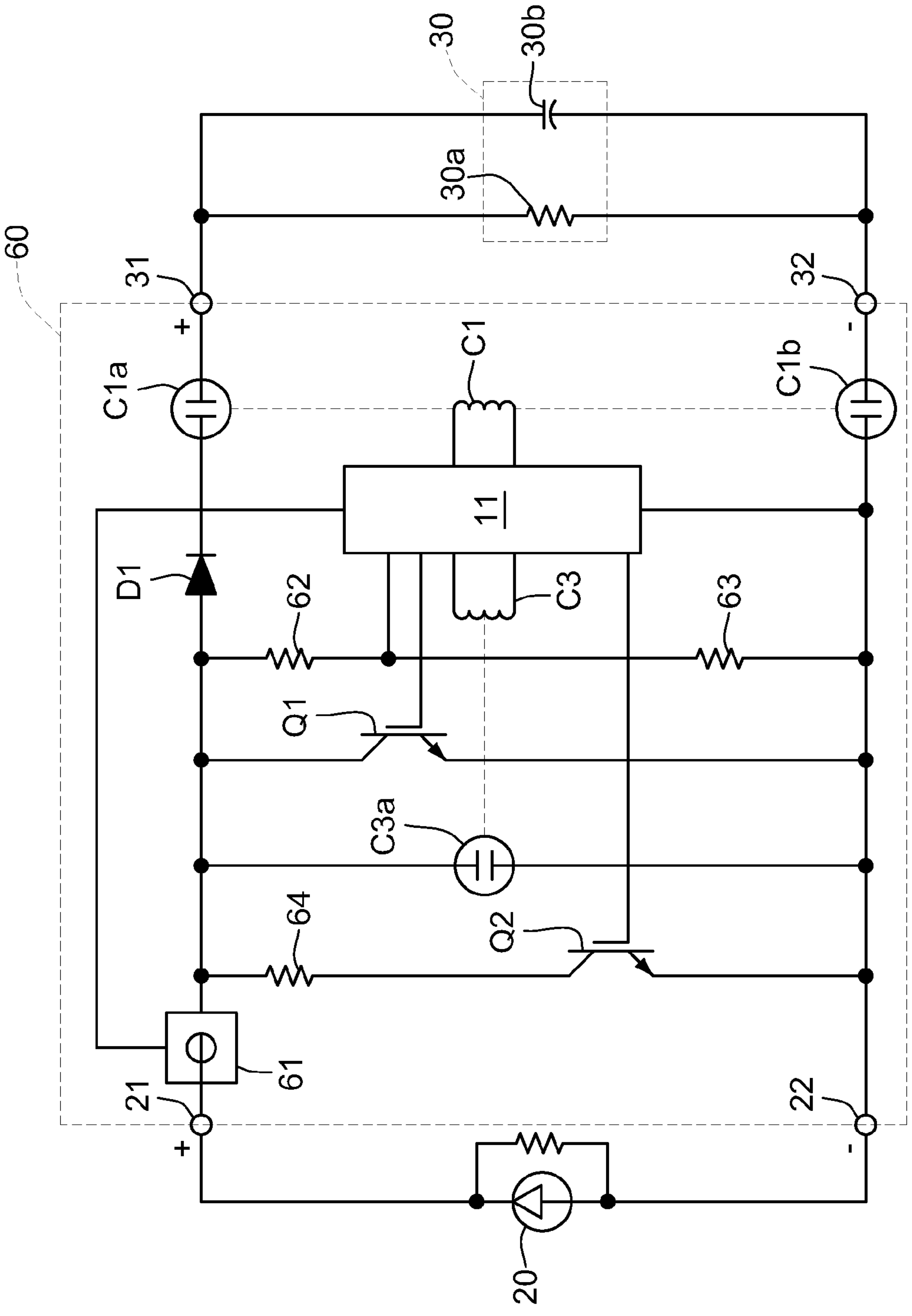
FIG. 4 is an electrical schematic diagram of a further modified version of the hybrid electrical switch of FIG. 1.

FIG. 4 illustrates another modified hybrid switch 60 that includes additional components and control functions to protect the hybrid switch under fault conditions. As part of any sequence where the transistor Q1 is turned on, a number of steps are taken to ensure that the semiconductor ratings will not be exceeded. First, the open circuit input voltage across the terminals 21 and 22 is read, via divider resistors 62 and 63, and is recorded by the programmable controller 11. Next, a second transistor Q2, connected across the terminals 21 and 22 in series with a resistor 64, is momentarily pulsed on, and the input terminal voltage is again read and recorded while the source 20 is loaded by the resistor 64. The ratio of (a) the open circuit input terminal voltage to (b) the input terminal voltage when the source 20 is momentarily loaded by the resistor 64, is used by the controller 11 to calculate the available short circuit current from source 20. If this calculated value is not within the capabilities of the transistor Q1, a fault is indicated, and the hybrid switch 60 will not close. Additionally, whenever the transistor Q1 is driven on, the terminal voltage is again read to look for a desaturated condition in the transistor Q1. If detected, the transistor Q1 is turned off, a fault is indicated, and the hybrid switch will not close.

The transistor Q2 and the resistor 64 may also be used to discharge any differential capacitance associated with the source 20 before the transistor Q1 is driven on. A current sensor 61 is coupled to the controller 11 to permit the controller to identify reverse current, overcurrent and leakage fault conditions. Under steady state conditions, when the transistors Q1 and Q2 are without drive and the coil C1 is not energized, if current is detected by the sensor 61, then a Load Break Sequence is re-initiated and a fault is logged by the controller 11. The signal from the current sensor 61 can also be used to compare the load current to a preprogrammed reference value stored in the controller 11 so that the hybrid switch can function as a circuit breaker.

If the programmable controller 11 detects an internal component failure such as welded contacts C1*a* or a failed transistor Q1, a fault is annunciated, and a non-load-break-rated latching contactor C3 is used as a failsafe device to indefinitely short circuit the source 20 via closed contacts 63*a* until the hybrid switch 60 can be serviced. In solar photovoltaic applications, additional latching contactor contacts (not shown) may be used in series with the current sensor 61 to break the circuit created by the latching contactor C3 after sunset to isolate the failed hybrid switch. Ideally, the hybrid switch should be single-fault-tolerant so that any of the power components can fail without presenting a safety or fire hazard.

Figure 5:
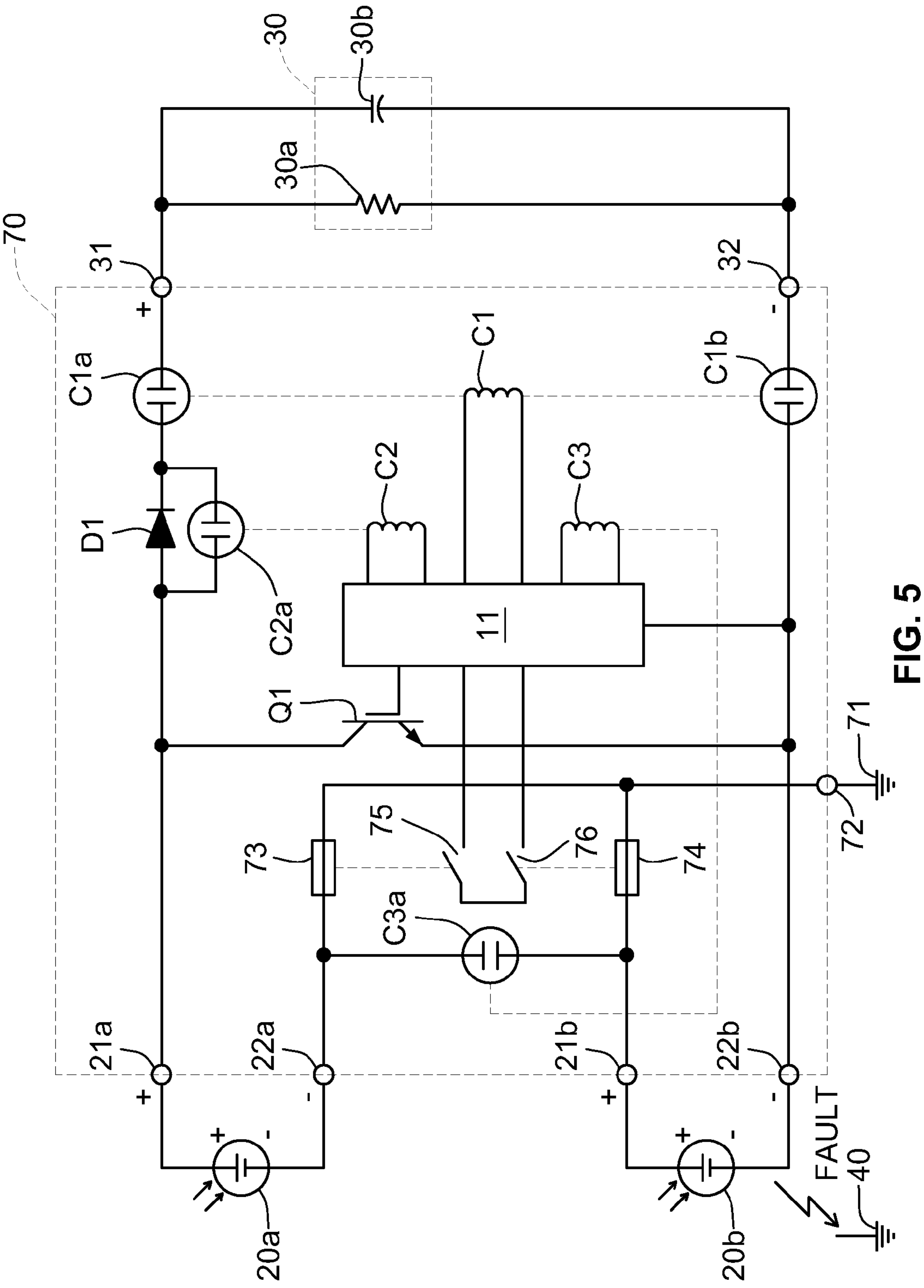
FIG. 5 is an electrical schematic diagram of yet another modified version of the hybrid electrical switch of FIG. 1.

FIG. 5 illustrates a hybrid switch 70 that is part of a solar photovoltaic (PV) power conversion system. A pair of solar photovoltaic arrays 20*a* and 20*b* are connected across respective terminal pairs 21*a*, 22*a* and 21*b*, 22*b*, respectively. The negative pole of the array 20*a* and the positive terminal of the array 20*b* are connected to earth ground 71 via terminal 72 through ground fault protection fuses 73 and 74, respectively, having respective blown-fuse indicating switches 75 and 76 connected to the controller 11. This photovoltaic array configuration is typically referred to as bipolar. The function of the hybrid switch 70 is basically the same as that of FIG. 2, but the controller 11 is logically integrated with the overall control of the power converter system. An additional contactor having a coil C3 and contacts C3*a* permits direct connection of the negative terminal 22*a* of the source 20*a* with the positive terminal 21*b* of the source 20*b*. In a grid-interactive PV power converter, the load resistor 30 is proportional to the power delivered to the electrical grid. The "value" of the load resistor 30 can be controlled by the power converter under normal operating conditions. As such, when no faults are present, the power into the grid, and therefore the current through the hybrid switch 70, can be reduced to zero before the contacts C1*a*, C1*b*, C2*a* and C3*a* are commanded to open, and thus the transistor Q1 need not be brought into conduction. The load capacitor 33 is the DC buss capacitance of the PV power converter and is essentially constant. The primary function of the hybrid switch 70 in PV applications is to interrupt full short circuit PV array current and to interrupt and isolate PV array ground faults. A secondary function is to provide protection from catastrophic PV power converter faults where the load resistance 30 becomes shorted or cannot be controlled. The hybrid switch works well with photovoltaic sources because the short circuit current of a PV source is typically only 125% that of the PV current at maximum power transfer.

As an operational example of the circuit topology shown in FIG. 5, assume that the PV power converter is operational and is transferring nominal power to the electric grid with contactors C1*a*, C1*b*, C2*a* and C3*a* closed when a ground fault (a short) from terminal 22*b* to earth 40 is established, as illustrated in FIG. 5. The following sequence will occur:

(i) Current from the fault is the available short circuit current from the PV array 20*b* and flows through the fuses 73 and 74.

(ii) The fuses 73 and 74 clear and blown-fuse indicators 75 and 76 signal a fault condition to the controller 11.

(iii) The contact coils C1 and C2 are energized by the controller 11 to open the contacts C1*a*, C1*b* and C2*a*.

(iv) After a delay to ensure that contacts C1*a*, C1*b* and C2*a* are fully open, the transistor Q1 is pulsed "on" to momentarily short circuit the series combination of the PV sources 20*a* and 20*b*. The conduction time of the transistor Q1 is just long enough to ensure that the diode D1 has been recovered and that arcing in the contacts C1*a* and C1*b* has been quenched.

(v) After the transistor Q1 has turned off, the coil C3 is de-energized and contacts C3*a* open.

This entire sequence takes place in less than 1 second. The PV array monopole 20*a* now floats with respect to ground, the PV power converter and the array monopole 20*b*. The PV array monopole 20*b* is grounded at the negative pole, terminal 22*b*, through the fault, but no fault current flows because the fault current return path has been eliminated.

The application illustrated in FIG. 5 can be configured from two of the circuits illustrated in FIG. 2, so that each photovoltaic monopole 20*a* and 20*b* is individually shorted while the electromechanical contacts open.

The controller 11 in most practical applications will be microprocessor-based and may have a number of current, voltage and temperature inputs, a number of transistor and contactor coil drive outputs, isolated external command input and outputs, isolated serial communications, an external or internal power supply, data and fault logging capability and self-diagnostic capabilities.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. An electrical switch apparatus for use in connecting and disconnecting a DC power source and a load, said switch apparatus comprising first and second pairs of controllable electromechanical contacts coupled to said DC power source and said load for connecting said power source to said load when said contacts are closed, and disconnecting said power source from said load when said contacts are open to provide galvanic isolation between said DC power source and said load, a diode coupled to said electromechanical contacts to prevent electrical current from flowing from said load to said DC power source, a controllable semiconductor switch coupled across said power source, and a controller coupled to said electromechanical contacts and said controllable semiconductor switch for producing control signals for opening and closing said contacts and for turning said controllable semiconductor switch on and off, said controller being programmed to produce a control signal for turning said semiconductor switch on to momentarily short circuit said DC power source when at least one of said first and second pairs of electromechanical contacts transitions from a closed condition to an open condition.

2. The electrical switch apparatus of claim 1 in which said first and second controllable electromechanical contacts comprise a first pair of contacts connected in series with positive terminals of said source and said load, and a second pair of contacts connected in series with negative terminals of said source and said load.

3. The electrical switch apparatus of claim 1 which includes a third pair of controllable electromechanical contacts connected in parallel with said diode for shunting said diode when said first and second pairs of contacts are closed, to prevent diode conduction losses.

4. The electrical switch apparatus of claim 1 which includes a plurality of DC power sources connected in a bipolar configuration, and said controllable semiconductor switch is coupled across said plurality of DC power sources.

5. The electrical switch apparatus of claim 1 in which said controller is programmed to control said semiconductor switch to momentarily short said DC power source, and to open at least one of said pairs of electromechanical contacts while said DC power source is short circuited by said semiconductor switch.

6. The electrical switch apparatus of claim 1 in which said controller is programmed to open at least one of said first and second pairs of electromechanical contacts, and to control said semiconductor switch to momentarily short said DC power source immediately after the opening of said at least one of said first and second pairs of electromechanical contacts.

7. The electrical switch apparatus of claim 1 which includes a third pair of controllable electromechanical contacts connected in parallel with said diode, and said controller is programmed to close said third pair of electromechanical contacts in response to a command to open at least one of said first and second pairs of contacts.

8. The electrical switch apparatus of claim 1 which includes a transient voltage suppressor connected across said controllable semiconductor switch to ensure that the breakdown voltage of said switch is not exceeded.

9. The electrical switch apparatus of claim 1 which includes a second diode connected across said controllable semiconductor switch to provide reverse polarity protection for said switch.

10. The electrical switch apparatus of claim 1 which includes a clamp network connected across said input terminals to slow the voltage rise time across said input terminals when said controllable semiconductor switch turns off.

11. The electrical switch apparatus of claim 1 which includes a ring-damping network connected across said diode.

12. The electrical switch apparatus of claim 1 which includes a transient voltage suppressor connected across said diode.

13. The electrical switch apparatus of claim 1 which includes a voltage sensor connected across said input terminals and coupled to said controller to supply said controller with a signal representing the open-circuit input voltage across said input terminals, a series-connected resistor and a second controllable semiconductor switch connected across said input terminals for temporarily connecting said resistor across said input terminals when said second semiconductor switch is closed, and said controller is programmed to use signals from said voltage sensor to detect the occurrence of a fault.

14. The electrical switch apparatus of claim 1 in which said controller is programmed to detect the occurrence of a fault by using said signals from said voltage sensor to determine the short circuit current available from said source, and comparing the determined short circuit current with a preselected value.

15. The electrical switch apparatus of claim 1 which includes a current sensor connected to the positive input terminal and coupled to said controller, and said controller is programmed to use the signal from said current sensor to identify reverse-current, overcurrent and leakage-fault conditions.

16. The electrical switch apparatus of claim 1 in which said DC source includes a pair of photovoltaic arrays connected in a bipolar configuration.

17. A method of connecting and disconnecting a DC power source and a load, said method comprising controlling the connection of said DC power source to said load via first and second pairs of controllable electromechanical contacts that connect said power source and said load when said contacts are closed, and that disconnect said power source from said load when said contacts are open to provide galvanic isolation between said DC power source and said load, preventing electrical current from flowing from said load to said power source, and momentarily short circuiting said DC power source when at least one of said first and second pairs of controllable electromechanical contacts transitions from a closed condition to an open condition.

* * * * *